UNITED STATES PATENT OFFICE.

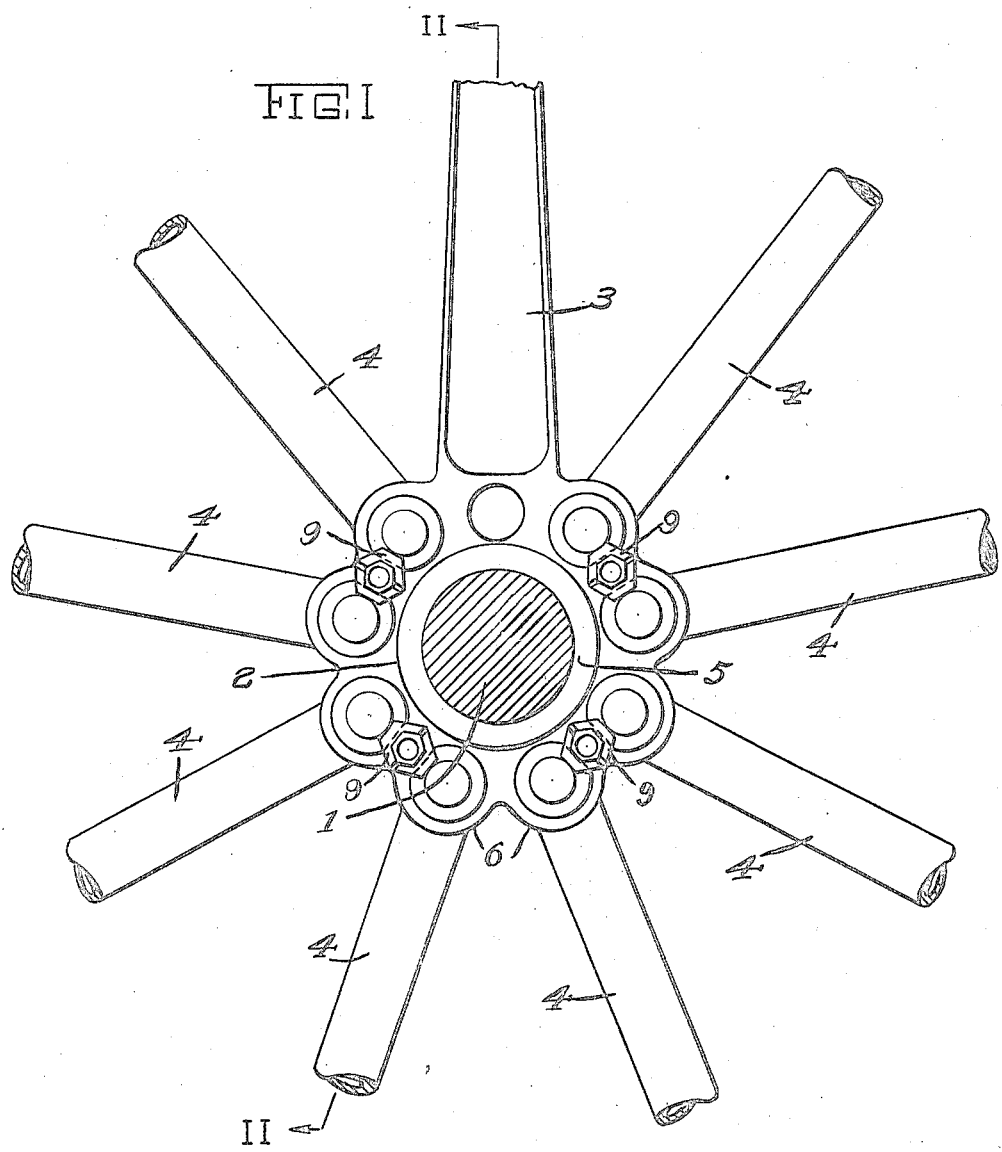

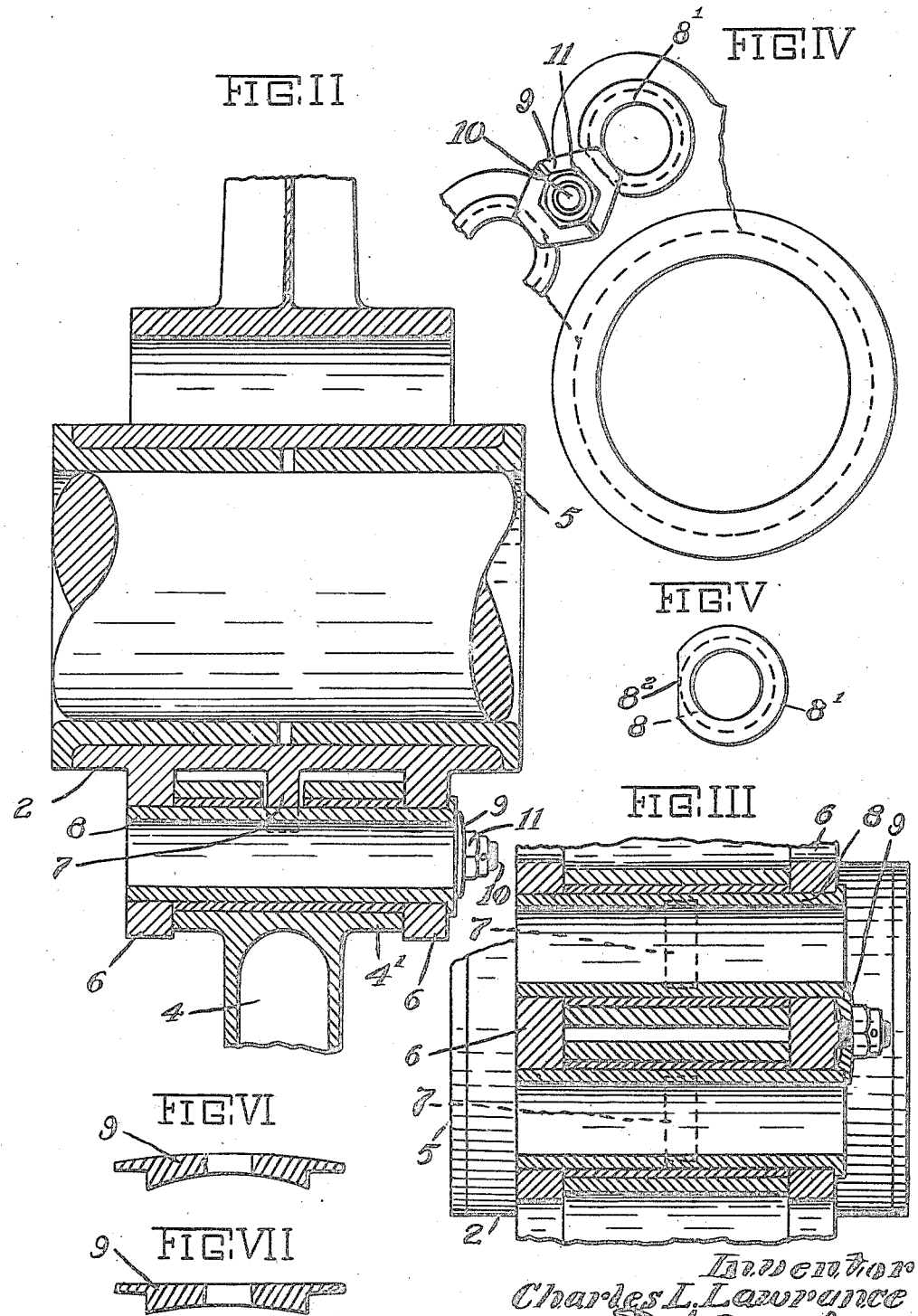

CHARLES L. LAWRANCE, OF BAYSHORE, LONG ISLAND, NEW YORK.

BIG-END CONSTRUCTION FOR RADIAL MOTORS.

1,398,194. Specification of Letters Patent. Patented Nov. 22, 1921.

Application filed May 7, 1920. Serial No. 379,585.

*To all whom it may concern:*

Be it known that I, CHARLES L. LAWRANCE, a citizen of the United States, residing at Bayshore, Long Island, county of Suffolk, State of New York, have invented certain new and useful Improvements in Big-End Construction for Radial Motors, of which the following is a specification.

My present invention relates to radial motors and particularly to that type in which a plurality of connecting rods are connected to a master piston rod about its bearing on a common crank pin.

The articulation of these several auxiliary connecting rods on the crank pin bearing of the master rod involves a variety of structural difficulties which had been only partially met and it was the object of my present invention to so improve this rather frequently used system of radial connecting rod assembly as to give a maximum of freedom to each rod with great strength and lightness.

As illustrative of the principles of my invention show a form which I have specially designed for air plane motors and which in practice offers many advantages in performance, in structure and in maintenance.

In these drawings and in the accompanying specification like reference characters are employed to indicate corresponding parts and in the drawings:

Figure I is an end view of the big end assembly of a plurality of connecting rods.

Fig. II is a section on the line II—II, Fig. I.

Fig. III is an enlarged section through the knuckle joint of a connecting rod.

Fig. IV a fragmentary end view showing the knuckle pin lock.

Fig. V an end view of a knuckle pin head, and

Figs. VI and VII central sections of such a lock in unstressed and stressed positions respectively.

I have indicated at 1 a crank pin on which is assembled the bearing 2 of a master connecting rod 3.

To this bearing are connected the ends of a plurality of connecting rods 4 of a radial motor, the other parts of which are not here shown, as they are unnecessary for an understanding of my present invention.

The bearing sleeve 2 which surrounds the crank pin 1 is babbitted as indicated at 5 and is provided externally with a series of ears 6 arranged in pairs as appears in Fig. II of the drawings.

Between the two ears of each pair lies a central bearing rib 7 which projects sufficiently above the outer surface of the bearing 2 to come in line with the lower part of the bore through the ears 6 and thus be concaved to receive and support the center of the tubular pin 8 which is lodged in this bore and which passes through the inner end 4' of the connecting rod 4, thus making a knuckle joint which gives a wide angle of freedom to the rod.

At one end the tubular pin 8 is headed with a slight flange 8'. This flange is milled off on one side to give a flat $8^2$. These flat portions $8^2$ on the rims of two adjacent pins 8 are disposed toward each other and are held clamped by a plate 9 set over a stud 10 disposed between them and sprung down by a nut 11 threaded on the stud.

As shown in Fig. VI this plate 9 is preferably formed with somewhat of an arch but when forced down by the nut 11 is flattened as appears in Fig. VII. This not only holds the pins 8 in but prevents any turning movement or play in the bearing sleeve 2.

Each connecting rod 4 therefore has a large independent bearing on the sleeve 2 affording a maximum of thrust receiving surface and a wide angle of free play. At the same time although these bearings are light, especially in their employment of the hollow pins 8, the connecting rod finds an unyielding footing and one that cannot give by springing on account of the supporting rib 7 located between the ends of the hollow pin 8.

The effect of the plate 8 sprung as it is between the opposed flattened faces $8^2$ of two adjacent knuckle pins is important in preventing their rotation. It also holds these pins against any vibration which tends to produce wear with the possibility of breakage at critical times.

Crank pin assemblies in accordance with my invention therefore possess those particular features of performance which are so much desired in radial engine construction and especially in radial engine for air plane service.

In addition, as will be apparent to those familiar with the requirements in such motors, the combination of the features shown in my invention and especially in the illustrative form which I have herein shown and described, possesses many practical advantages both in manufacture and in maintenance. The crank pin sleeve or bearing carried by the connecting rod 3 is simple, light, compact and easily machined. My locking system of the pins is simple and efficient and permits the disconnection of pistons in as short as possible a time and with the greatest convenience.

While my invention is in itself limited inasmuch as it applies to only one part of the motor, it nevertheless is capable of a considerable range of variation in its adaptation to motors of different types. While therefore I have for the purposes of explanation limited my discussion to a particular type of motor in which it seems especially advantageous, my invention is not to be narrowly construed and all the various modifications and uses within the limits of the appended claims are to be construed as included in its scope.

What I therefore claim and desire to secure by Letters Patent is:

1. In a motor of the class described, a crank assembly comprising a bearing sleeve on the crank pin, and a plurality of auxiliary connecting rods spaced about said bearing and connected thereto each by a joint consisting of a pair of longitudinally disposed end bearings, a central bearing rib, and a pin passing through said end bearings and the interposed end of a connecting rod, said connecting rod being slotted to permit the central bearing rib to contact with the lower face of the hollow pin.

2. In a motor of the class described, a crank assembly comprising a bearing sleeve on the crank pin, and a plurality of auxiliary connecting rods spaced about said bearing and connected thereto each by a joint consisting of a pair of longitudinally disposed end bearings, a bearing rib, and a tubular pin passing through said end bearings, and the interposed end of a connecting rod, said connecting rod being slotted to permit the bearing rib to contact with the lower face of the hollow pin.

3. In a motor of the class described, a crank assembly comprising a bearing sleeve on the crank pin, and a plurality of auxiliary connecting rods spaced about said bearing and connected thereto each by a joint consisting of a pair of longitudinally disposed bearings, a pin passing through said end bearings and the interposed end of a connecting rod, said pin having a flanged head at one end, the heads of two adjacent pins having flats, a lock plate disposed between said flattened faces, and a threaded connection for drawing down said plate to tighten it between said flattened faces.

4. In a motor of the class described, a crank assembly comprising a bearing sleeve on the crank pin and carried by one of the master rods, and a plurality of auxiliary connecting rods spaced about said bearing and connected thereto each by a joint consisting of a pair of longitudinally disposed end bearings, a central bearing rib, and a pin passing through said end bearings and the interposed end of a connecting rod, said connecting rod being slotted to permit the central bearing rib to contact with the lower face of the hollow pin.

5. A crank pin connection comprising a pair of bearings, a connecting rod end disposed between said bearings and having a bore alined therewith, said connecting rod end being centrally slotted to expose a portion of the periphery of the pin, and a supporting rib intermediate of said end bearing and contacting with the lower surface of said pin through said connecting rod and slot.

6. A crank pin connection comprising plural pairs of bearings, a connecting rod end disposed between each of said bearing pairs and having a bore alined therewith, a pin through said rod end and bearings, said pin having a flanged head at one end, the heads of two adjacent pins having flats, a lock plate disposed between said flattened faces, and a threaded connection for drawing down said plate to tighten it between said flattened faces.

7. A crank pin connection comprising plural pairs of bearings, connecting rod ends disposed between each pair of bearings, headed pins each connecting a rod end and its pair of bearings, a locking member disposed between heads of each adjacent pair of pins, and means for drawing said locking member into frictional clamping engagement with said heads.

In testimony whereof I affix my signature in presence of two witnesses.

CHARLES L. LAWRANCE.

Witnesses:
JOSEPH WERTZHEISER,
HARRY E. RODACK.